(12) United States Patent
Noguchi (10) Patent No.: US 7,840,347 B2
(45) Date of Patent: Nov. 23, 2010

(54) NAVIGATION SYSTEM AND ROUTE SETTING METHOD

(75) Inventor: Shigeki Noguchi, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 1051 days.

(21) Appl. No.: 11/593,475

(22) Filed: Nov. 7, 2006

(65) Prior Publication Data

US 2007/0106466 A1      May 10, 2007

(30) Foreign Application Priority Data

Nov. 8, 2005    (JP)   ............................. 2005-323110

(51) Int. Cl.
     *G06F 15/02*      (2006.01)
(52) U.S. Cl. .................... 701/209; 340/995.2
(58) Field of Classification Search ................. 701/209, 701/202, 206, 211; 340/995.2, 995.27; 345/173
See application file for complete search history.

(56) References Cited

U.S. PATENT DOCUMENTS 7,084,859 B1 *    8/2006    Pryor .......................... 345/173
7,546,188 B2 *    6/2009    Nezu et al. ..................... 701/36

FOREIGN PATENT DOCUMENTS

JP      2000-111354 A      4/2000

* cited by examiner

*Primary Examiner*—Dalena Tran
(74) *Attorney, Agent, or Firm*—Crowell & Moring LLP (57) ABSTRACT

A navigation system comprises an image display unit at which various images including a map are displayed, a touch panel operation detection unit that detects a touch panel operation performed by a user based upon a contact position at which the user has touched the image display unit, a specified road detection unit that detects a road segment specified by the user by tracing a corresponding road portion present in the map, based upon a locus of the contact position resulting from the touch panel operation detected by the touch panel operation detection unit, and a route setting unit that extends the detected road segment along a direction in which the road portion has been traced by the user and sets the extended road segment as a route to follow.

14 Claims, 9 Drawing Sheets

NAVIGATION SYSTEM AND ROUTE SETTING METHOD

INCORPORATION BY REFERENCE

The disclosure of the following priority application is herein incorporated by reference:
Japanese Patent Application No. 2005-323110 filed Nov. 8, 2005

BACKGROUND OF THE INVENTION

1. Field of the Invention

The present invention relates to a navigation system that guides a vehicle to a destination along a route entered through a touch panel operation.

2. Description of Related Art

There is a navigation system known in the related art that displays a map at a touch panel-type display device and sets a route to a destination as the user specifies roads leading to the destination by sequentially tracing them on the map with his finger (Japanese Laid-Open Patent Application No. 2000-111354). This navigation system requires the user to trace all the roads present on the route to be set with his finger. This means that if the destination is at a remote location, the user needs to trace roads over a significant distance, which makes the route setting a time-consuming task.

SUMMARY OF THE INVENTION

According to the first aspect of the present invention, the navigation system comprises an image display unit at which various images including a map are displayed, a touch panel operation detection unit that detects a touch panel operation performed by a user based upon a contact position at which the user has touched the image display unit, a specified road detection unit that detects a road segment specified by the user by tracing a corresponding road portion present in the map, based upon a locus of the contact position resulting from the touch panel operation detected by the touch panel operation detection unit, and a route setting unit that extends the detected road segment along a direction in which the road portion has been traced by the user and sets the extended road segment as a route to follow.

According to the second aspect of the present invention, in the navigation system according to the first aspect, it is desirable that, if an intersection is present within a predetermined specific distance from the detected road segment, the route setting unit extends the detected road segment to the intersection and sets the extended road segment as the route, and if no intersection is present within the specific distance from the detected road segment, the route setting unit extends the detected road segment by the specific distance and sets the extended road segment as the route.

According to the third aspect of the present invention, in the navigation system according to the first aspect, if a length of the contact position locus resulting from the touch panel operation is equal to or greater than a predetermined specific value, the route setting unit may preferably set the extended road segment as the route, and if the length of the contact position locus is less than the specific value, the route setting unit may preferably set the detected road segment as the route.

According to the fourth aspect of the present invention, in the navigation system according to the first aspect, the route setting unit can change a distance by which the detected road segment is extended in correspondence to the type of the road.

According to the fifth aspect of the present invention, in the navigation system according to the first aspect, the navigation system may further comprise a destination setting unit that sets a destination and a route adjusting unit that adjusts the route by adding a new road segment to the route or clearing a redundant road segment from the route in correspondence to the destination having been set by the destination setting unit.

According to the sixth aspect of the present invention, in the navigation system according to the first aspect, the navigation system may further comprise a pop-up display control unit that brings up at the image display unit a pop-up display of a selector button to allow the user to select to set a destination if the route setting unit extends the detected road segment in response to a touch panel operation by the user and the touch panel operation is sustained over a length of time equal to or greater than a predetermined length of time after the detected road segment is extended, a destination setting unit that sets as the destination a contact point at which the touch panel operation is sustained over the length of time equal to or greater than the predetermined length of time if the user selects to set a destination via the selector button and a route clearing unit that clears an extended portion of the extended road segment in correspondence to the destination having been set by the destination setting unit.

According to the seventh aspect of the present invention, in the navigation system according to the first aspect, the navigation system may further comprise a corrected route setting unit that sets, based upon detection results provided by the specified road detection. unit, a corrected route to which the route having been ultimately set by the route setting unit is corrected. In this navigation system according to the seventh aspect, it is desirable that the corrected route setting unit sets either the detected road segment or the extended road segment as the corrected route.

According to the eighth aspect of the present invention, in the navigation system according to the seventh aspect, the corrected route setting unit may preferably complete setting of the corrected route when the corrected route is set to connect with the route having been ultimately set or to reach the destination.

According to the ninth aspect of the present invention, the method for setting a route in a navigation system comprises displaying any of various types of images, such as a map, at a display monitor, detecting a touch panel operation performed by a user based upon a contact position at which the user has touched the display monitor, detecting a road segment specified by the user by tracing a corresponding road portion present in the map, based upon a locus of the contact position resulting from the touch panel operation, extending the detected road segment along a direction in which the road portion has been traced by the user, and setting the extended road segment as a route to follow.

According to the tenth aspect of the present invention, in the method for setting a route according to the ninth aspect, it is desirable that, if an intersection is present within a predetermined specific distance from the detected road segment, the detected road segment is extended to the intersection, and if no intersection is present within the specific distance from the detected road segment, the detected road segment is extended by the specific distance.

According to the eleventh aspect of the present invention, in the method for setting a route according to the ninth aspect, if a length of the contact position locus resulting from the touch panel operation is equal to or greater than a predetermined specific value, the extended road segment may preferably be set as the route, and if the length of the contact position locus is less than the specific value, the detected road segment may preferably be set as the route.

According to the twelfth aspect of the present invention, in the method for setting a route according to the ninth aspect, a distance by which the detected road segment is extended can be changed in correspondence to the type of the road.

According to the thirteenth aspect of the present invention, in the method for setting a route according to the ninth aspect, the method for setting a route may further comprise setting a destination and adjusting the route by adding a new road segment to the route or clearing a redundant road segment from the route in correspondence to the destination having been set.

According to the fourteenth aspect of the present invention, in the method for setting a route according to the ninth aspect, the method for setting a route may further comprise bringing up at the display monitor a pop-up display of a selector button to allow the user to select to set a destination if the detected road segment is extended in response to a touch panel operation by the user and the touch panel operation is sustained over a length of time equal to or greater than a predetermined length of time after the detected road segment is extended, setting as a destination a contact point at which the touch panel operation is sustained over a length of time equal to or greater than the predetermined length of time if the user selects to set a destination via the selector button, and clearing an extended portion of the extended road segment in correspondence to the destination having been set.

According to the fifteenth aspect of the present invention, in the method for setting a route according to the ninth aspect, the method for setting a route may further comprise setting a corrected route to which the route having been ultimately set is corrected based upon detection results of the road segment. In this method for setting a route according to the fifteenth aspect, it is desirable that when setting the corrected route, either the detected road segment or the extended road segment is set as the corrected route.

According to the sixteenth aspect of the present invention, in the method for setting a route according to the fifteenth aspect, setting of the corrected route may preferably be completed when the corrected route is set to connect with the route having been ultimately set or to reach the destination.

DESCRIPTION OF THE PREFERRED EMBODIMENTS

Figure 1:
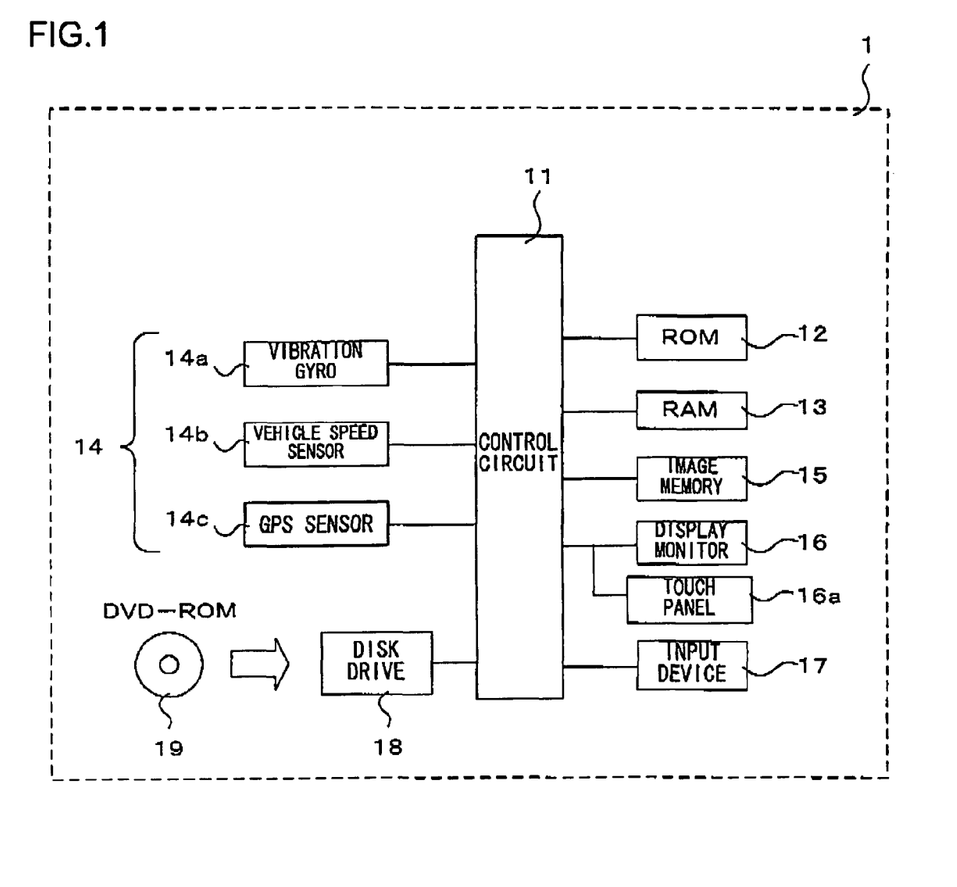
FIG. 1 is a block diagram showing the structure of the navigation system according to an embodiment of the present invention.

FIG. 1 shows the structure adopted in the navigation system achieved in an embodiment of the present invention. This navigation system is installed and used in a vehicle. The navigation system sets a specific road traced by the user's finger on a map on display at a touch panel-type display monitor as part of the route to a destination. It then guides the subject vehicle to the destination along the route. The navigation system 1 in FIG. 1 comprises a control circuit 11, a ROM 12, a RAM 13, a current position detection device 14, an image memory 15, a display monitor 16, an input device 17 and a disk drive 18. A DVO-ROM 19 having recorded therein map data is loaded into the disk drive 18.

The control circuit 11 constituted with a microprocessor and its peripheral circuits uses the RAM 13 as its work area when executing a control program stored in the ROM 12 to implement various types of processing and control. The control circuit 11 executes processing such as map display based upon the map data recorded in the DVD-ROM 19.

The current position detection device 14 detects the current position of the subject vehicle. It may comprise, for instance, a vibration gyro 14*a* that detects the advancing direction of the subject vehicle, a vehicle speed sensor 14*b* that detects the vehicle speed, a GPS sensor 14*c* that detects a GPS signal transmitted from a GPS satellite and the like. The navigation system 1 engages the current position detection device 14 to detect the current position of the subject vehicle, i.e., the subject vehicle position.

The image memory 15 temporarily holds image data to be displayed at the display monitor 16. The image data include road map drawing data and various types of graphic data used to display a road map, which are created by the control circuit 11 based upon the map data recorded in the DVD-ROM 19. Based upon the image data stored in the image memory 15, various types of images such as a map images are displayed at the display monitor 16.

The display monitor 16 is utilized in conjunction with a touch panel 16*a*. As a given position on the display monitor 16 is touched by a user's finger or the like, information indicating the finger contact position is output from the touch panel 16*a* to the control circuit 11. Based upon the contact position information, the control circuit 11 makes a decision as to the specific part of the image on display at the display monitor 16 that has been touched. The navigation system 1 in the embodiment executes various types of processing in response to touch panel operations performed by the user, which are detected via the touch panel 16*a* and the control circuit 11 as described above.

Various user operations are entered via the input device 17. The input device 17 may be an operation panel or a remote control unit. Operations indicating the map scrolling direction, constituting a map scaling factor adjustment instruction and the like are entered via the input device 17. It is to be noted that such operations may also be entered through touch panel operations as described earlier. For this reason, it is not strictly necessary for the navigation system 1 in the embodiment to be equipped with the input device 17.

The disk drive 15 reads map data to be used to display a roadmap from the DVD-ROM 19 loaded therein. The map data include route calculation data, route guidance data, road data and background data. The route calculation data are used to search for a route to the destination. The route guidance data, which indicate intersection names, road names and the like, are used to guide the subject vehicle to the destination along the route having been set. The road data express roads. The background data express geographical entities other than roads, such as rivers, railway tracks and various types of facilities (landmarks) present on the map.

The smallest unit of road data indicating a road segment is referred to as a link, each road is made up of a plurality of links. A point at which links connect with each other is referred to as a node, which holds position information (coordinate information). Based upon the position information held at the nodes, the shape of each link, i.e., the shape of the corresponding road segment, is determined. It is to be noted that while an explanation is given in reference to the embodiment on an example in which the map data are read from a DVD-ROM, the map data may instead be read out from a recording medium other than a DVD-ROM, such as a CD-ROM or a hard disk.

At the navigation system 1 achieved in the embodiment, the route to the destination is set as explained below in response to touch panel operations performed by the user. As the user specifies a road to be set as part of the route among the roads in the map on display at the display monitor 16 by tracing the road with his finger through a touch panel operation, the locus of the contact position is detected. Based upon this contact position locus, the road having been specified by the user is determined. The road having been thus specified is then added as part of the route through which the vehicle should advance to reach the destination.

The route having been set as described above is indicated on the map by assuming a display mode different from the display mode for the other roads, e.g., by using a different display color. This allows the user to visually verify the road having been set as part of the route. As the user sequentially specifies roads connecting the subject vehicle position and the destination by tracing them through similar touch panel operations, the entire route to the destination is set.

With the entire route to the destination set as described above, the navigation system 1 provides the user with visual or audio directions along the advancing direction so as to guide the subject vehicle along the route. As explained above, the navigation system 1 displays a map and guides the subject vehicle to the destination along the route having been set on the map by the user by tracing specific roads. Route guidance to the destination is thus provided.

Figure 2:
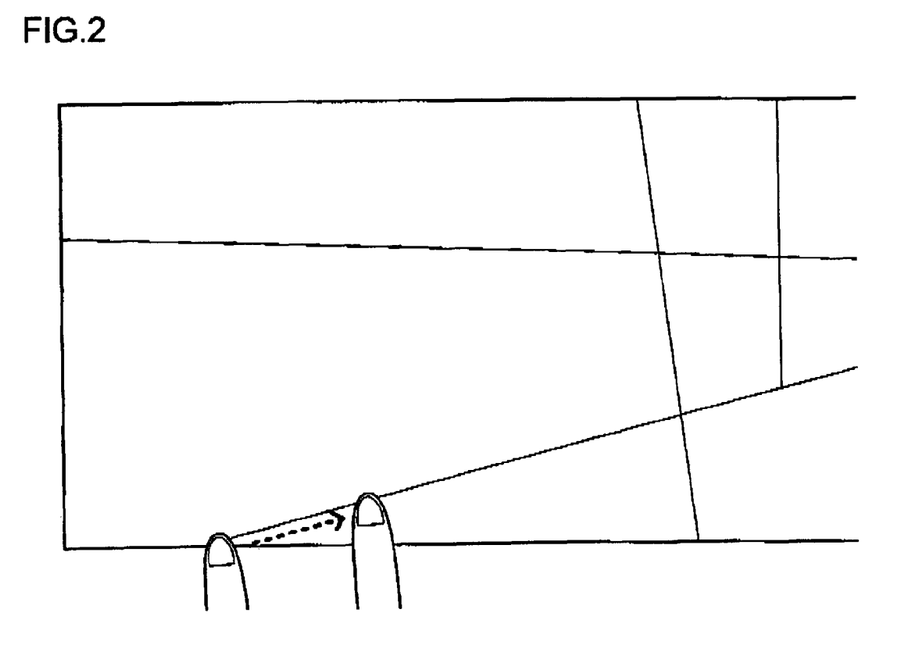
FIG. 2 shows a situation in which the user specifies a given road on map image by tracing it with his finger.
Figure 3:
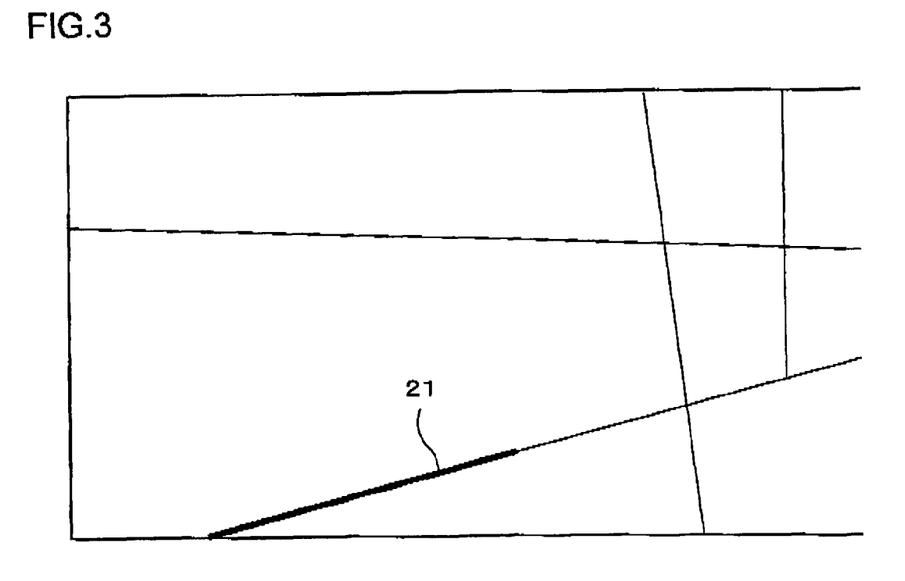
FIG. 3 shows a screen on which the route having been set by the operation shown in FIG. 2 is displayed.

The method adopted in the navigation system 1 when setting the route to the destination is now explained in reference to the drawings. FIG. 2 presents an example of a map image that may be displayed at the display monitor 16. As the user specifies a given road on the map by tracing it with his finger, as shown in FIG. 2, the locus of the user contact position corresponding to the touch panel operation is detected by the navigation system 1. Then, a road segment containing the traced portion of the road is set as the route. As a result, a screen such as that shown in FIG. 3 is brought up on display at the display monitor 16. In this screen, the route 21 having been set is indicated with a line bolder than those indicating the other roads.

It is to be noted that when the route is set as described above, the range of the road segment to be set as the route changes in correspondence to the length over which the user has traced the road on the screen, i.e., in correspondence to the length of the locus of the contact position resulting from the touch panel operation. More specifically, if the length of the contact position locus is less than a predetermined specific value, the road segment having been specified by the user through actually tracing it with his finger (hereafter referred to as a specified road segment) is directly set as the route. If, on the other hand, the length of the contact position locus is equal to or greater than the predetermined value, a road segment containing the specified road segment and an extension along the direction in which the road has been traced by the user (hereafter referred to as an extended road segment) is set as the route. The route 21 in FIG. 3 is set through the latter method. Namely, an extended road segment longer than the specified road segment specified by the user through tracing a certain range of a road with his finger as shown in FIG. 2 is set as the route 21.

Figure 4:
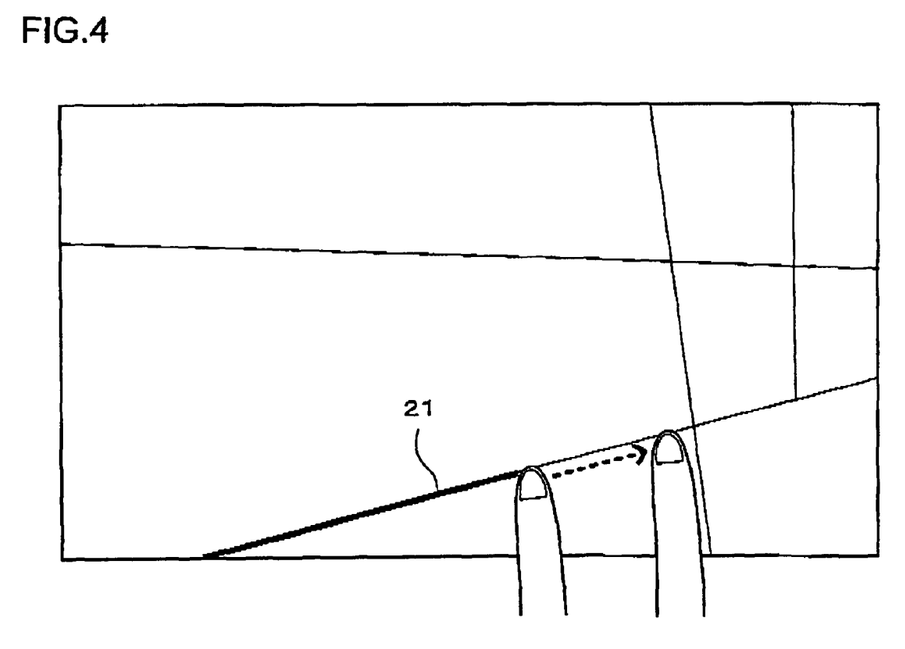
FIG. 4 shows a situation in which the user specifies a road segment beyond the route having been set on the map. image by tracing it with his finger.
Figure 5:
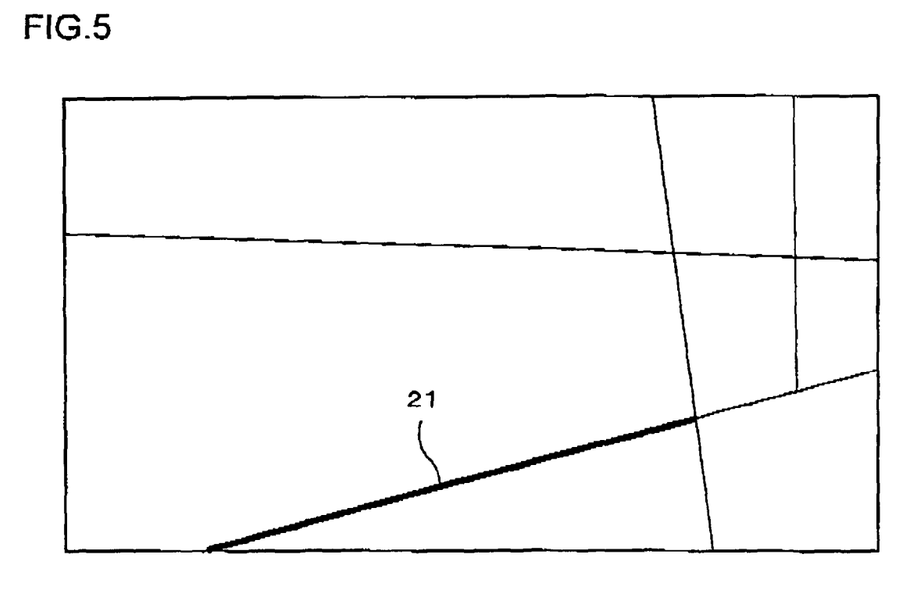
FIG. 5 shows a screen on which the route having been set by the operation shown in FIG. 4 is displayed.

Then, as the user specifies another road segment directly beyond the route 21 having been set by tracing it with his finger, as shown in FIG. 4, a road segment containing the new specified road segment is added into the route 21, thereby resetting the route 21. As a result, a screen such as that shown in FIG. 5 is displayed at the display monitor 16. If the length of the contact position locus is equal to or greater than the predetermined value mentioned earlier, an extended road segment is added into the route 21 as explained earlier. However, if an intersection is present halfway through the extended road segment as shown in FIG. 5, only the road segment leading to the intersection is added into the route 21 as the extended road segment. It is to be noted that this restriction may be imposed at major intersections only, instead of applying the restriction at all the intersections.

Figure 6:
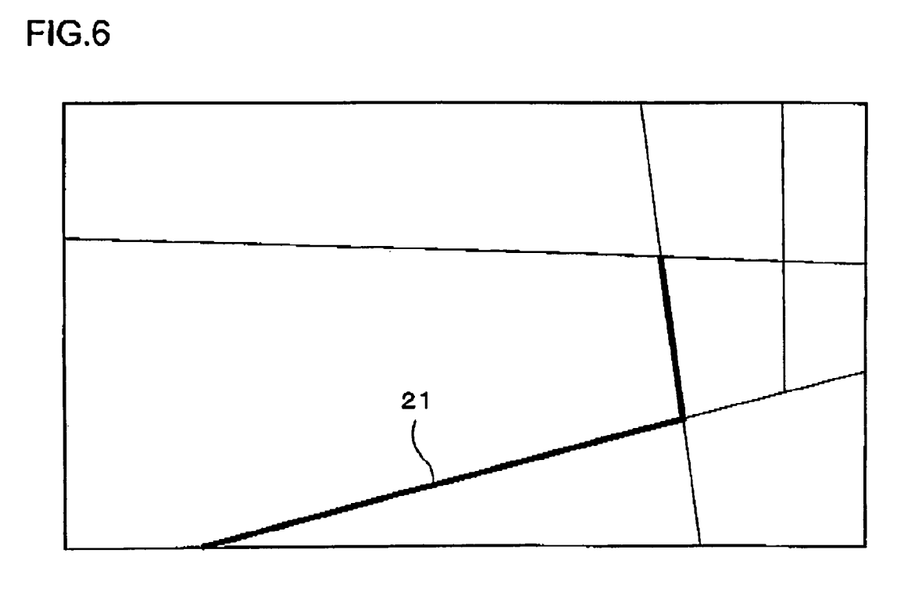
FIG. 6 shows a screen on which the route having been set by repeatedly executing operations similar to that shown in FIGS. 2 and 4.
Figure 7:
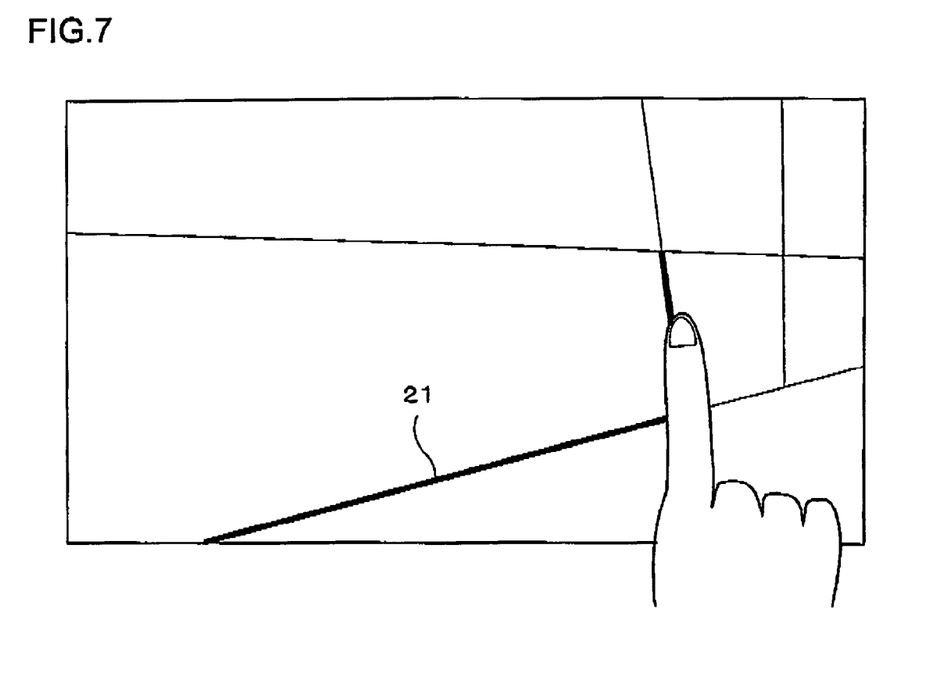
FIG. 7 shows a situation in which the user's finger holds a specific point on the map over a length of time equal to or greater than a predetermined length of time.
Figure 8:
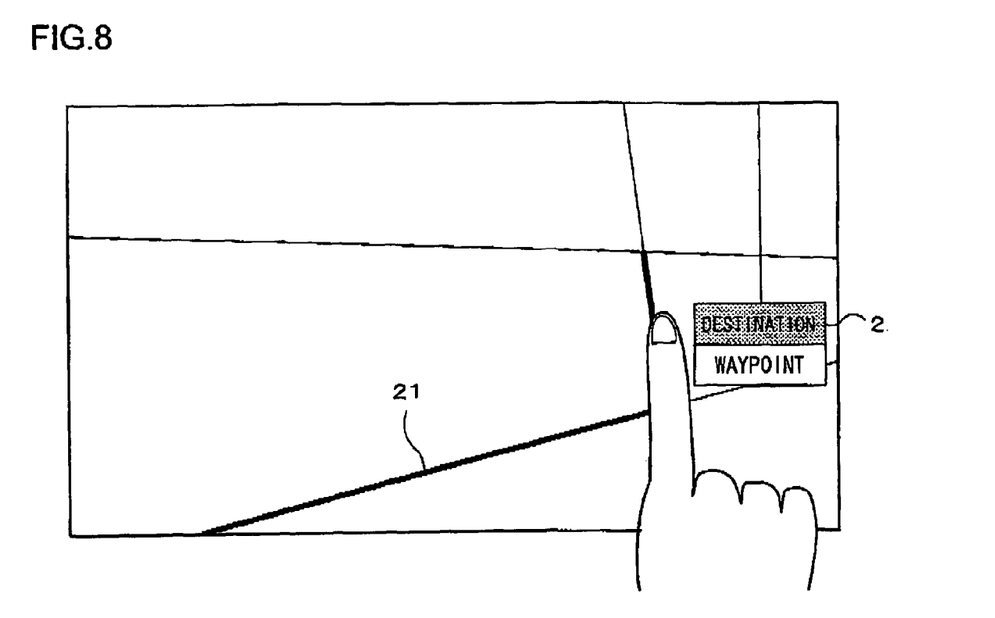
FIG. 8 shows a screen on which a selector button is displayed by the operation shown in FIG. 7.

By repeatedly executing operations similar to that explained above, specified road segments and extended road segments are sequentially set each as additional part of the route 21 through user touch panel operations. Let us now assume that the route 21 has been set as shown in FIG. 6 as a result of such touch panel operations. If the user's finger holds a specific point on the map over a length of time equal to or greater than a predetermined length of time, as shown in FIG. 7 in the screen, a screen such as that shown in FIG. 8 is displayed. The screen in FIG. 8 includes a pop-up display of a selector button 22 brought up near the point having been held by the user's finger to allow the user to set the point either as the destination or as a waypoint.

If the user selects "destination" at the selector button 22 in FIG. 8 through a touch panel operation, the point having been held by the user's finger is set as the destination and the entire route is thus set. If, on the other hand, the user selects "waypoint" at the selector button 22 through a touch panel operation, the point having been held by the user's finger is set as a waypoint. In this case, the route setting operation is continuously executed as explained above until the destination is set.

Figure 9:
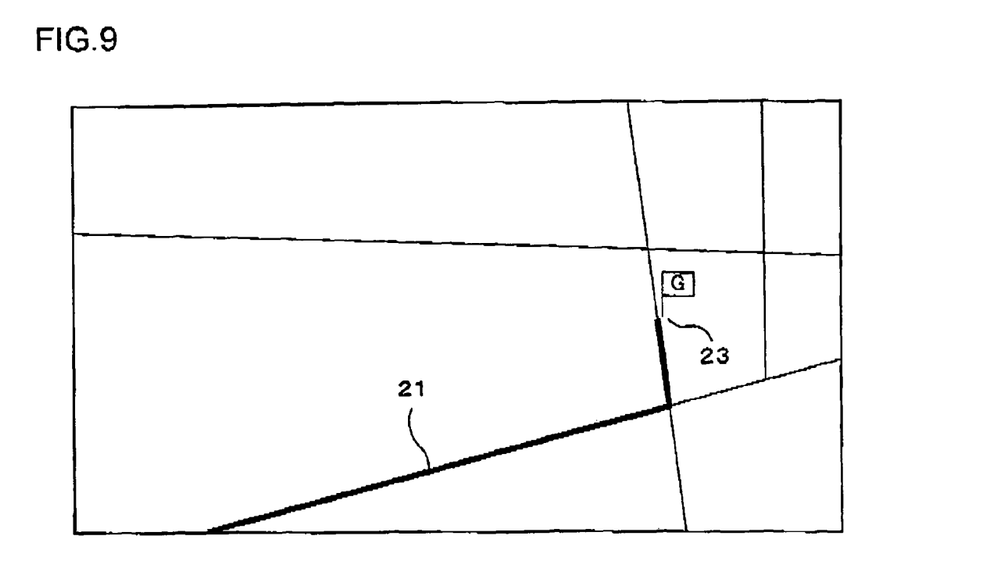
FIG. 9 shows a screen on which a destination is set and displayed.

If the point having been held by the user's finger is set as the destination, a screen such as that shown in FIG. 9 is displayed at the display monitor 16. The redundant portion of the route 21 in FIG. 8, i.e., the road range beyond the destination 23, is no longer part of the route in this screen, and the route 21 becomes thus adjusted in correspondence to the destination 23. In other words, once the destination is set, the route having already been set is adjusted in accordance with the destination. It is to be noted that if the route has not reached the destination or a waypoint or if the route extending from the subject vehicle position has not yet been set the missing part of the route is added so as to adjust the route. The route to the destination is set as described above.

The method adopted when correcting a route having already been set is explained. The navigation system 1 achieved in the embodiment allows the user to correct the route having already been set as described above, by tracing a road not present in the currently set route through a touch panel operation so that the corrected route contains the particular road.

Figure 10:
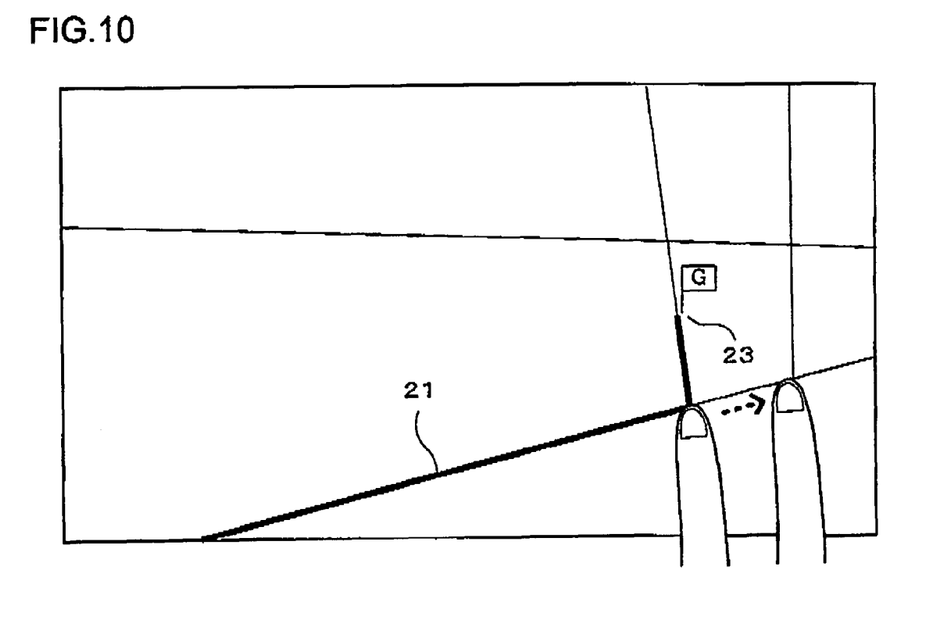
FIG. 10 shows a situation in which the route having already been set is corrected.

As shown in FIG. 10, if the user traces with his finger a road that is not part of the route 21 and extends from a point contained on the route 21 after the route 21 to the destination has been set, this touch panel operation is detected by the navigation system 1. Upon detecting the touch panel operation, the navigation system displays a specific road segment containing the traced portion, as indicated by reference numeral 31 in FIG. 11. This road segment, indicating a corrected route to which the route 21 is to be corrected is displayed by using a display color different from that used for the initially set route 21 and as a line bolder than those indicating the other roads. The corrected road 31 is thus set.

Figure 11:
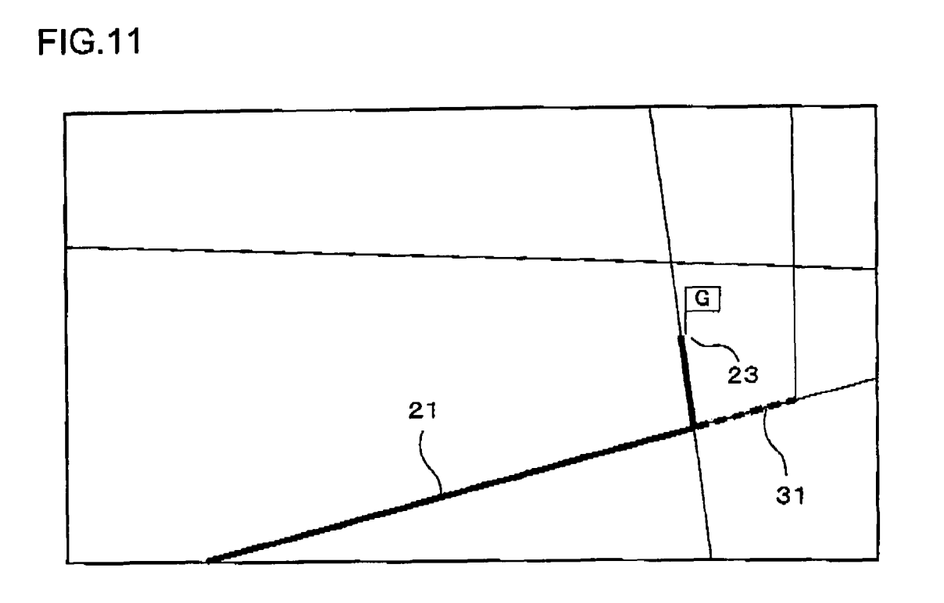
FIG. 11 shows a screen on which the corrected route having been set by the operation shown in FIG. 10 is displayed.

It is to be noted that when the corrected route 31 is set as described above, the range of the corrected route 31 to be set as the route changes in correspondence to the length over which the user has traced the road on the screen, i.e., in correspondence to the length of the locus of the contact position resulting from the touch panel operation, just as when setting the route 21. More specifically, if the length of the contact position locus is equal to or greater than the predetermined value, an extended road segment containing the specified road segment and an extension along the direction in which the road has been traced by the user is set as the corrected route. It is to be noted that if an intersection is present halfway through the extended road segment, only the road segment leading to the intersection is set as the corrected route. If, on the other hand, the length of the locus of the contact position is less than the predetermined value, the specified road segment actually traced by the user's finger is directly set as the corrected route.

Figure 12:
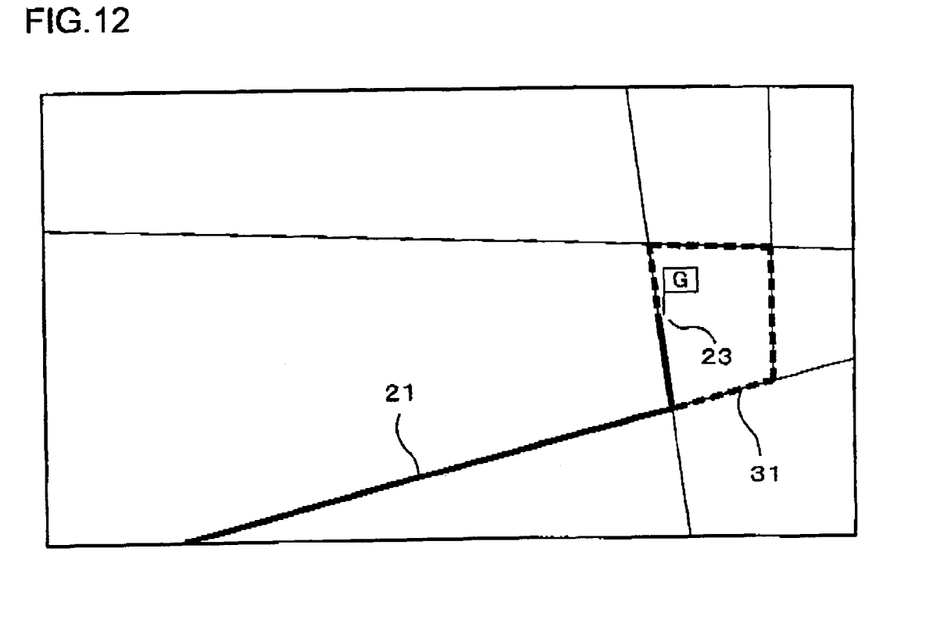
FIG. 12 shows a screen on which a corrected route having been set by repeatedly executing operations similar to that shown in FIG. 10 is displayed.
Figure 13:
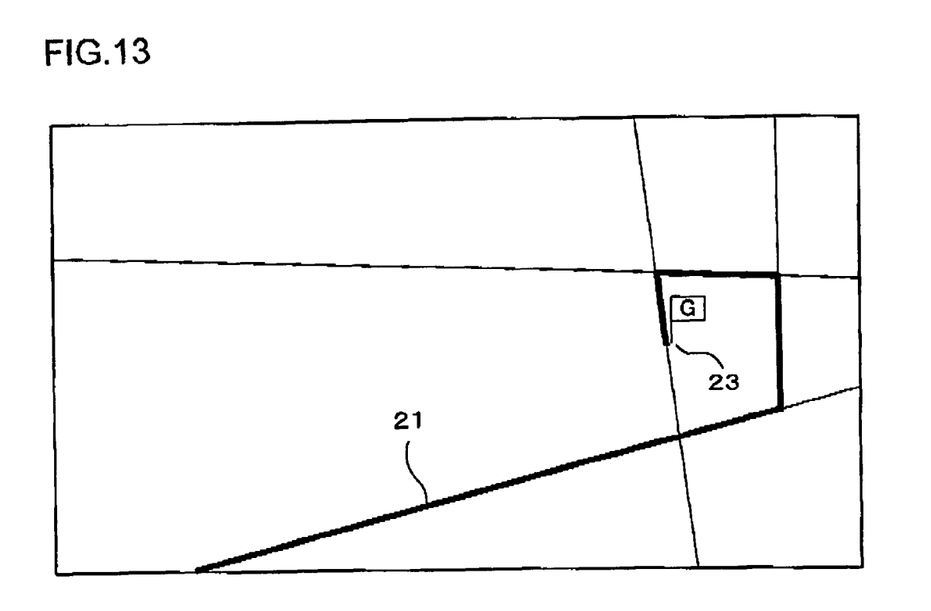
FIG. 13 shows a screen on which the route having been corrected by setting the corrected route is displayed.

By repeatedly executing operations similar to that described above, specified road segments and extended road segments are added to the corrected route 31 in sequence. By doing this, additional parts of the corrected route 31 are set in a continuous sequence. Once the corrected route 31 to the destination 23 is set, the screen in FIG. 12 is displayed at the display monitor 16. The route 21 is then replaced with the corrected route 31 and the redundant portion of the route 21 is cleared. As a result, the screen in FIG. 13 is displayed. As the corrected route set as described above reaches the destination, the route is corrected accordingly. It is to be noted that when the corrected route reaches a halfway point in the route instead of the destination, the route is adjusted to the corrected route in a similar manner.

Figure 14:
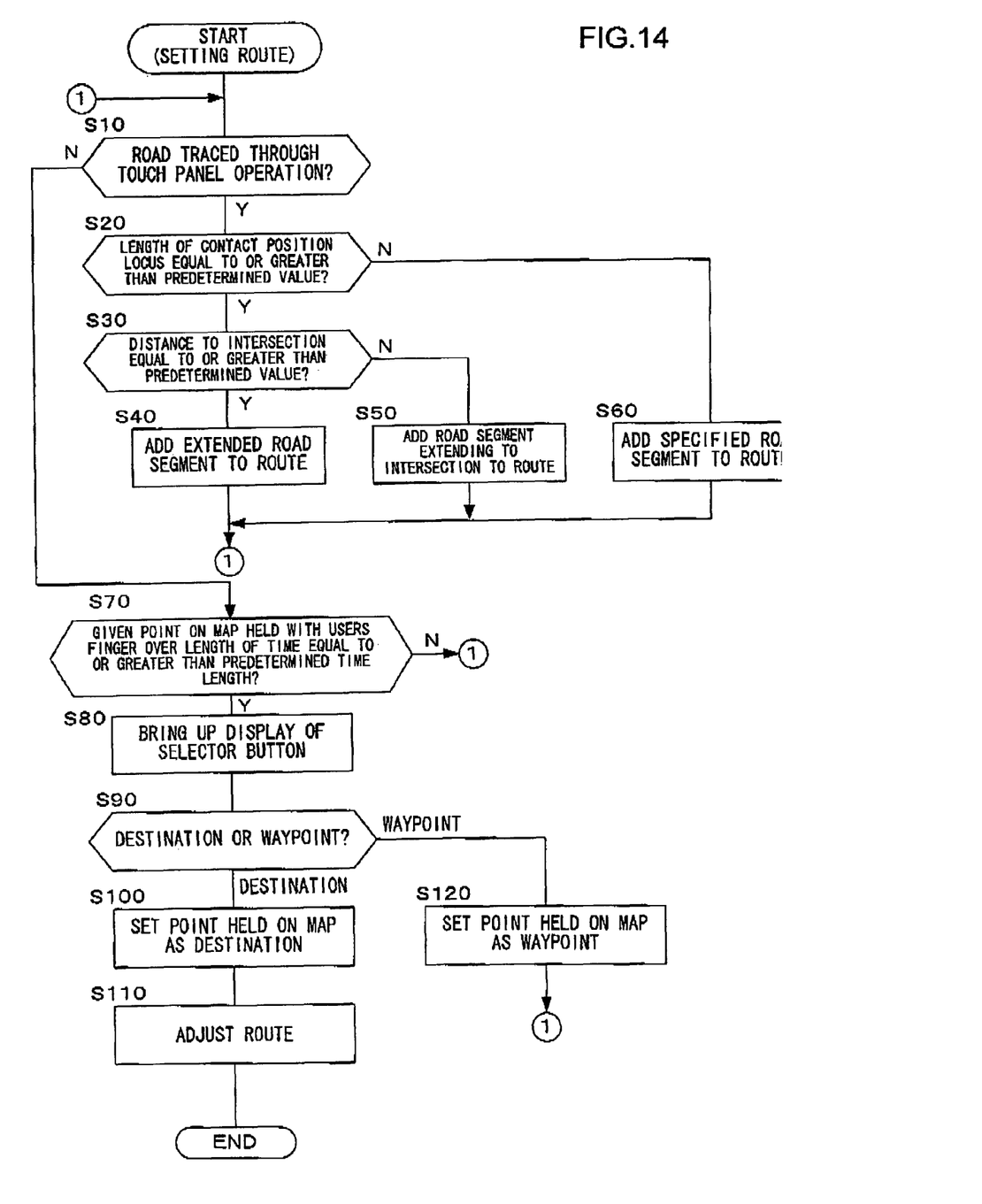
FIG. 14 presents a flowchart executed when setting a route.
Figure 15:
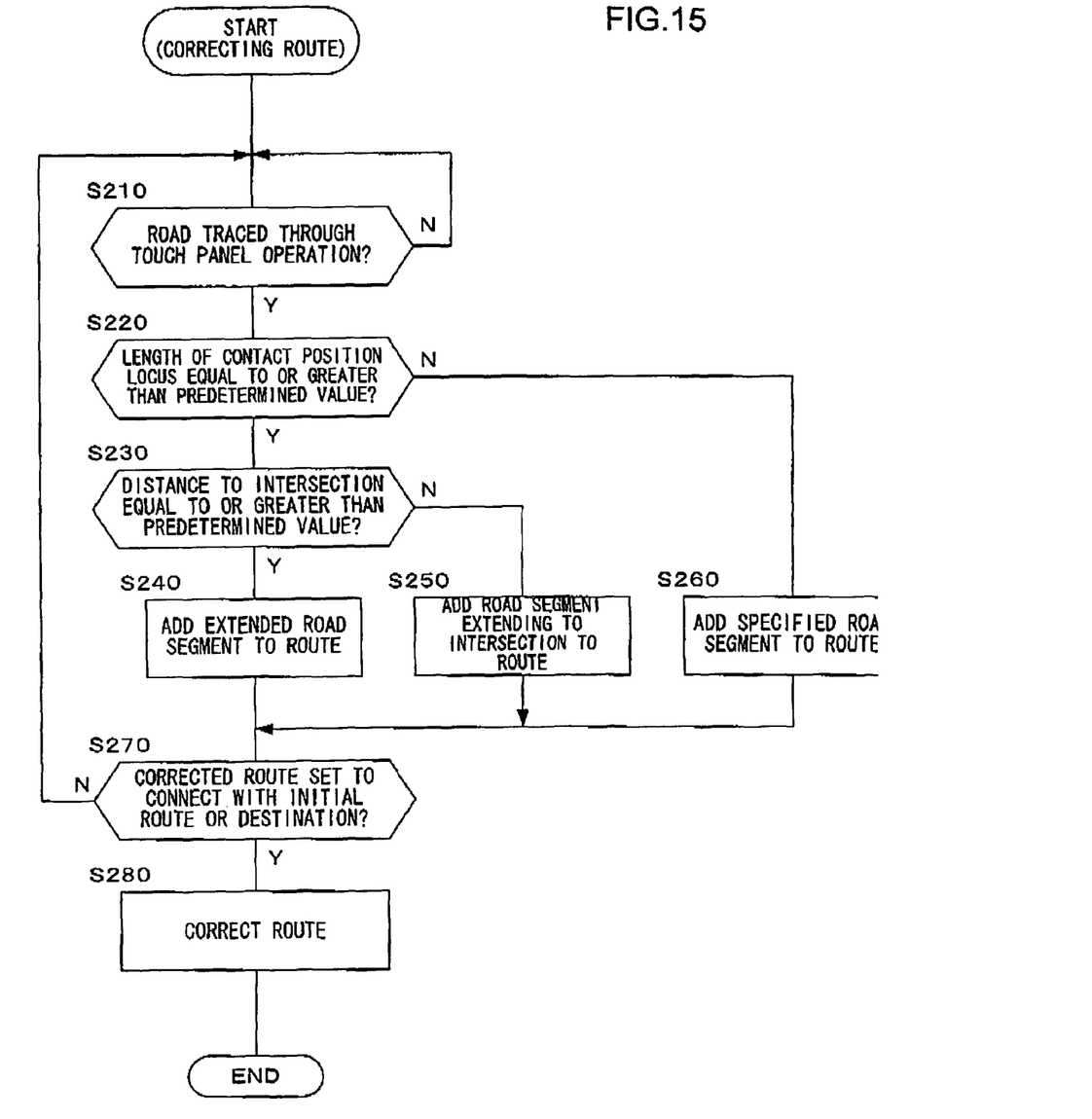
FIG. 15 presents a flowchart executed when correcting the route having already been set.

FIGS. 14 and 15 present flowcharts of the operations executed in the navigation system 1 in the embodiment as described above. FIG. 14 presents a flowchart of the operation executed by the control circuit 11 when setting a route, as has been explained in reference to FIGS. 2 through 9. FIG. 15 presents a flowchart of the operation executed by the control circuit 11 when correcting the route having already been set, as has been explained in reference to FIGS. 10 through 13. The operation shown in the flowchart in FIG. 14 is first explained.

In step S10 in FIG. 14, the contact position locus corresponding to a touch panel operation performed by the user is detected and a decision is made based upon the detection results as to whether or not a road among the roads present in the map on display at the display monitor 16 has been traced. If it is decided that a road has been traced, the corresponding specified road segment having been specified by the user through the touch panel operation is detected and the operation proceeds to step S20. If a negative decision is made in step S10, however, the operation proceeds to step S70. The operation executed in step S20 and subsequent steps is first explained.

In step S20, a decision is made as to whether or not the length of the contact position locus having been detected in step S10 is equal to or greater than the predetermined specific value, e.g., 3 cm. If the locus length is determined to be equal to or greater than the predetermined value, the operation proceeds to step S30, whereas if the locus length is determined to be less than the predetermined value, the operation proceeds to step S60. In step S30, a decision is made as to whether or not the distance from the road portion having been traced by the user's finger to an intersection is equal to or greater than a predetermined specific value, e.g., 10 km. If the distance is determined to be equal to or greater than the predetermined value, the operation proceeds to step S40, whereas if the distance is determined to be less than the predetermined value, the operation proceeds to step S50.

If the operation proceeds from step S30 to step S40, an extended road segment extending beyond the specified road segment having been detected in step S10 is added as part of the route. The length of this extended road segment is greater than the specified road segment by the predetermined value having been used in the decision-making in step S30. Namely, if no intersection is present within a predetermined distance range from the road portion having been traced by the user's finger, an affirmative decision is made in step S30 and the operation proceeds to step S40. Then, in step S40, the road segment longer than the road segment having been traced by the user by the predetermined distance range is set as at least part of the route.

If, on the other hand, the operation proceeds from step S30 to step S50, an extended road segment extending to the intersection beyond the specified road segment having been detected in step S10 is added into the route. Namely, if there is an intersection present within the predetermined specific distance range from the touch operation start point, a negative decision is made in step S30 and the operation proceeds to step S50. In this case, the road segment extending to the intersection beyond the road segment having been traced by the user's finger is set at least as part of the route in step S50.

In addition, if the operation proceeds from step S20 to step S60, the specified road segment having been detected in step S10 is added into the route. Namely, if the length of the contact position locus is less than the predetermined specific value, the road segment specified by the user through actually tracing the road portion is directly set at least as part of the route.

As the processing in step S40, step S50 or step S60 described above is executed, the route along which the subject vehicle should advance is set in the navigation system 1. It is desirable that the screen be automatically scrolled so as to position the end point of the route having been set at the center of the screen. The operation then returns to step S10 to repeatedly execute similar processing.

It is to be noted that when setting the route by executing the processing in the flowchart as explained above, the length of the extended road segment to be added into the route in step S40 may be changed in correspondence to the type of the particular road. Namely, the length of the extended road segment may be set to greater values for higher order road types such as express highways and national highways and the length of the extended road segment may be set to smaller values for lower order road types. For instance, the length of the extended road segment on express highways may be set to approximately 80 km, equivalent to a road segment typically containing four interchanges, the length of the extended road segment on national highways may be set to approximately 10 km, the length of the extended road segment on prefectural roads may be set to approximately 5 km and the length of the extended road segment on local roads may be set to approximately 1 km. Any of these varying lengths of extended road segments can be added as part of the route in response to a touch panel operation performed by the user. This allows the length of the road segment to be set as part of the route through a single touch panel operation to be changed in correspondence to each road type by, for instance, increasing the length of the road segment set for a major artery that the user is likely to set as part of the route over a greater distance compared to the length of the road segment set for a minor road. As a result, better operability for the user is assured. It is to be noted that if the length of the road segment is changed in correspondence to the road type, the value representing the distance to the intersection, used in the decision-making executed in step S30, too, needs to be adjusted so as to reflect the change in the length of the extended road segment.

Next, the processing executed after the operation proceeds from step S10 to step S70 is explained. In step S70, a decision is made based upon the touch panel operation detection results as to whether or not a point on the map on display at the display monitor 16 has been held by the user's finger over a length of time equal to or greater than a predetermined length of time. If it is decided that a point on the map has been held by the user's finger over a length of time equal to or greater than the predetermined length of time, the operation proceeds to step S80. If, on the other hand, it is decided that no point on the map has been held by the user's finger over a length of time equal to or greater than the predetermined length of time, the operation returns to step S10 to repeatedly execute the processing explained earlier.

In step S80, the selector button 22 in FIG. 8 is brought up as a pop-up display near the point having been held by the user's finger. In the following step S90, a decision is made as to whether either "destination" or "waypoint" at the selector button having been brought up on display in step S80 has been selected by the user. If "destination" has been selected, the operation proceeds to step S100, whereas if "waypoint" has been selected, the operation proceeds to step S120.

In step S100, the point having been held by the user's finger, detected in step S70, is set as the destination. In the following step S110, a road segment is added as a new part of the route having been set or any redundant portion of the route having been set is cleared, as described earlier, so as to adjust the route in correspondence to the destination having been set in step S100. Once step S110 is executed, the processing in the flowchart presented in FIG. 14 ends. If, on the other hand, the operation proceeds to step S120, the point having been held by the users finger is set as a waypoint and the operation then returns to step S110. The route is set as explained above.

The processing executed as shown in the flowchart presented in FIG. 15 is explained next. In step S210, the contact position locus corresponding to a touch panel operation performed by the user is detected and a decision is made based upon the detection results as to whether or not a road among the roads present in the map on display at the display monitor 16 has been traced, as in step S10 in FIG. 14. If it is decided that a road has been traced, the corresponding road segment having been specified by the user through the touch panel operation is detected and the operation proceeds to step S220.

In step S220 through step S240, the corrected route is set by executing processing similar to that executed in steps S20 through S60 in FIG. 14. Namely, provided that the length of the contact position locus having been detected in step S210 is equal to or greater than the predetermined value and the distance to an intersection is equal to or greater than the predetermined distance, an extended road segment longer than the specified road segment having been detected in step S210 by the predetermined distance is added into the corrected route. However, if the distance to the intersection is less than the predetermined distance, an extended road segment extending beyond the specified road segment to reach the intersection is added into the corrected route. If the length of the contact position locus having been detected in step S210 is less than the predetermined value, the specified road segment having been detected in step S210 is directly added as part of the corrected route. As a result, either the extended road, segment or a specified road segment is set at least as part of the corrected route.

In step S270, a decision is made as to whether or not the corrected route set as described above connects with the initial route which is ultimately set by the processing of the flowchart shown in FIG. 14 or with the destination. If the corrected route has been set so as to return to the initial route or to reach with the destination, the operation proceeds to step S280 to correct the initial route to the new route, before the processing in the flowchart presented in FIG. 15 ends. The route having already been set is thus corrected. If, on the other hand, a corrected route connecting with the route or returning to the initial destination has not been set yet, the operation returns to step S210 to continuously execute the processing.

The following advantages are achieved in the embodiment described above.

(1) The road segment specified by the user through tracing the corresponding road portion in the map displayed at the display monitor 16 is detected (step S10 or S210) based upon the locus of the user contact position resulting from a touch panel operation. A road segment extended beyond the specified road segment along the direction in which the road has been traced by the user is then set as at least part of the route (steps S40 and S50, or steps S240 and S250). As a result, the navigation system, which guides the vehicle to the destination along the route entered through touch panel operations, allows the user to specify roads to be set as part of the route more quickly and easily.

(2) A decision is made as to whether or not an intersection is present within the predetermined specific distance from the specified road segment (step S30 or S230). If it is decided that an intersection is present within the predetermined distance, a road segment extended beyond the specified road segment and reaching the intersection is set as at least part of the route (step S50 or S250). If, on the other hand, it is decided that no intersection is present within the predetermined distance, a road segment extended beyond the specified road segment by the predetermined distance is set as at least part of the route (step S40 or S240). As a result, erroneous setting of a route running beyond an intersection at which the route takes a turn is prevented.

(3) A decision is made as to whether or not the length of the contact position locus resulting from a touch panel operation is less than the predetermined specific value (step S20 or S220) and if it is decided that the locus length is equal to or greater than the predetermined value, a road segment extended beyond the specified road segment by the predetermined distance or extended beyond the specified road segment to reach an intersection is set as at least part of the route (steps S40 and S50 or steps S240 and S250). If, on the other hand, the locus length is determined to be less than the predetermined value, the road segment having been specified by the user by tracing the corresponding road portion is directly set as at least part of the route (step S60 or S260). This allows the route to be set in fine detail in response to user operations.

(4) The distance by which the specified road segment is extended in step S40 or step S240 is changed in correspondence to the road type. As a result, better ease of operation is afforded for the user as explained earlier.

(5) After the destination is set (step S100), the route is adjusted (step S110) by adding a new road segment or clearing any redundant road segment in correspondence to the destination having been set. As a result, the vehicle can be guided to the destination with a high level of reliability along the route having been thus adjusted.

The embodiment and variations thereof described above are simply provided as examples and the present invention is in no way limited by their specific details, as long as the features characterizing the present invention are not compromised.

What is claimed is:

1. A navigation system comprising:
   an image display unit at which various images including a map are displayed;
   a touch panel operation detection unit that detects a touch panel operation performed by a user based upon a contact position at which the user has touched the image display unit;
   a specified road detection unit that detects a road segment specified by the user by tracing a corresponding road portion present in the map, based upon a locus of the contact position resulting from the touch panel operation detected by the touch panel operation detection unit; and
   a route setting unit that extends the detected road segment along a direction in which the road portion has been traced by the user and sets the extended road segment as a route to follow; wherein:
   if a length of the contact position locus resulting from the touch panel operation is equal to or greater than a predetermined specific value, the route setting unit sets the extended road segment as the route; and
   if the length of the contact position locus is less than the specific value, the route setting unit sets the detected road segment as the route.

2. A navigation system according to claim 1, wherein:
   if an intersection is present within a predetermined specific distance from the detected road segment, the route setting unit extends the detected road segment to the intersection and sets the extended road segment as the route; and
   if no intersection is present within the specific distance from the detected road segment, the route setting unit extends the detected road segment by the specific distance and sets the extended road segment as the route.

3. A navigation system according to claim 1, wherein:
   the route setting unit changes a distance by which the detected road segment is extended in correspondence to the type of the road.

4. A navigation system according to claim 1, further comprising:
   a destination setting unit that sets a destination; and
   a route adjusting unit that adjusts the route by adding a new road segment to the route or clearing a redundant road segment from the route in correspondence to the destination having been set by the destination setting unit.

5. A navigation system according to claim 1, further comprising:
   a pop-up display control unit that brings up at the image display unit a pop-up display of a selector button to allow the user to select to set a destination if the route setting unit extends the detected road segment in response to a touch panel operation by the user and the touch panel operation is sustained over a length of time equal to or greater than a predetermined length of time after the detected road segment is extended;
   a destination setting unit that sets as the destination a contact point at which the touch panel operation is sustained over the length of time equal to or greater than the predetermined length of time if the user selects to set a destination via the selector button; and
   a route clearing unit that clears an extended portion of the extended road segment in correspondence to the destination having been set by the destination setting unit.

6. A navigation system according to claim 1, further comprising:
   a corrected route setting unit that sets, based upon detection results provided by the specified road detection unit, a corrected route to which the route having been ultimately set by the route setting unit is corrected, wherein:
   the corrected route setting unit sets either the detected road segment or the extended road segment as the corrected route.

7. A navigation system according to claim 6, wherein:
   the corrected route setting unit completes setting of the corrected route when the corrected route is set to connect with the route having been ultimately set or to reach the destination.

8. A method for setting a route in a navigation system, comprising:
   displaying any of various types of images, such as a map, at a display monitor;
   detecting a touch panel operation performed by a user based upon a contact position at which the user has touched the display monitor;
   detecting a road segment specified by the user by tracing a corresponding road portion present in the map, based upon a locus of the contact position resulting from the touch panel operation;
   extending the detected road segment along a direction in which the road portion has been traced by the user; and
   setting the extended road segment as a route to follow; wherein:
   if a length of the contact position locus resulting from the touch panel operation is equal to or greater than a predetermined specific value, the extended road segment is set as the route; and
   if the length of the contact position locus is less than the specific value, the detected road segment is set as the route.

9. A method for setting a route according to claim 8, wherein:
   if an intersection is present within a predetermined specific distance from the detected road segment, the detected road segment is extended to the intersection; and
   if no intersection is present within the specific distance from the detected road segment, the detected road segment is extended by the specific distance.

10. A method for setting a route according to claim 8, wherein:

a distance by which the detected road segment is extended is changed in correspondence to the type of the road.

11. A method for setting a route according to claim 8, further comprising:

setting a destination; and adjusting the route by adding a new road segment to the route or clearing a redundant road segment from the route in correspondence to the destination having been set.

12. A method for setting a route according to claim 8, further comprising:

bringing up at the display monitor a pop-up display of a selector button to allow the user to select to set a destination if the detected road segment is extended in response to a touch panel operation by the user and the touch panel operation is sustained over a length of time equal to or greater than a predetermined length of time after the detected road segment is extended;

setting as a destination a contact point at which the touch panel operation is sustained over a length of time equal to or greater than the predetermined length of time if the user selects to set a destination via the selector button; and clearing an extended portion of the extended road segment in correspondence to the destination having been set.

13. A method for setting a route according to claim 8, further comprising:

setting a corrected route to which the route having been ultimately set is corrected based upon detection results of the road segment, wherein:

when setting the corrected route, either the detected road segment or the extended road segment is set as the corrected route.

14. A method for setting a route according to claim 13, wherein:

setting of the corrected route is completed when the corrected route is set to connect with the route having been ultimately set or to reach the destination.

\* \* \* \* \*